United States Patent
Hamme et al.

(10) Patent No.: US 10,597,128 B2
(45) Date of Patent: Mar. 24, 2020

(54) DIVER NAVIGATION, INFORMATION AND SAFETY BUOY

(71) Applicant: The United States of America as represented by the Secretary of the Navy, San Diego, CA (US)

(72) Inventors: Lonnie A. Hamme, Jamul, CA (US); Vladimir Djapic, San Diego, CA (US)

(73) Assignee: United States of America as represented by the Secretary of te Navy, Washington, DC (US)

( * ) Notice: Subject to any disclaimer, the term of this patent is extended or adjusted under 35 U.S.C. 154(b) by 344 days.

(21) Appl. No.: 15/845,646

(22) Filed: Dec. 18, 2017

(65) Prior Publication Data

US 2019/0185122 A1  Jun. 20, 2019

(51) Int. Cl.
| | |
|---|---|
| *G01S 15/87* | (2006.01) |
| *G01S 19/14* | (2010.01) |
| *G01C 21/00* | (2006.01) |
| *B63C 11/26* | (2006.01) |
| *G01S 15/74* | (2006.01) |
| *G01S 15/88* | (2006.01) |

(52) U.S. Cl.
CPC .............. *B63C 11/26* (2013.01); *G01C 21/00* (2013.01); *G01S 15/74* (2013.01); *G01S 15/874* (2013.01); *G01S 15/876* (2013.01); *G01S 15/88* (2013.01); *G01S 19/14* (2013.01)

(58) Field of Classification Search
CPC ....... B63C 11/26; G01S 15/876; G01S 15/88; G01S 15/74; G01S 15/874; G01S 19/14; G01S 1/725; G01S 2201/07; G01C 21/00; B63B 2035/007

See application file for complete search history.

(56) References Cited

U.S. PATENT DOCUMENTS

| | | |
|---|---|---|
| 5,331,602 A | 7/1994 | McLaren |
| 6,058,071 A | 5/2000 | Woodall |
| 7,650,208 B2 | 1/2010 | Basilico |
| 8,259,822 B1 | 9/2012 | Feher |
| 8,515,344 B2 | 8/2013 | Rhodes |
| 9,616,982 B2 | 4/2017 | Hollis |
| 2007/0032266 A1 | 2/2007 | Feher |

(Continued)

OTHER PUBLICATIONS

V. Djapic, Đ. Nad, G. Ferri, E, Omerdić, G. Dooly, D. Toal and Z. Vukić, Zoran. "Novel method for underwater navigation aiding using a companion underwater robot as a guiding guiding platforms," in Proceedings of MTS/IEEE Oceans 2013, (Bergen, Norway), IEEE Oceanic Engineering Society, Jun. 10-14, 2013.

(Continued)

*Primary Examiner* — Daniel Pihulic
(74) *Attorney, Agent, or Firm* — Naval Information Warfare Center, Pacific; Kyle Eppele (57) ABSTRACT

A diver navigation, information and safety buoy system and method. The system and method incorporate a float device, and an ultra-short baseline acoustic array in communication with a diver transponder. The system and method also include a GPS system having a GPS antenna device mounted on the float device. The system also includes an AIS system having an AIS antenna mounted on the float. A diver processor permits a diver's location information to be calculated, and the diver can be navigated to a desired destination.

20 Claims, 6 Drawing Sheets

(56) References Cited

U.S. PATENT DOCUMENTS

| | | | |
|---|---|---|---|
| 2011/0141853 A1* | 6/2011 | Megdal | G01S 3/8083 367/117 |
| 2014/0126334 A1* | 5/2014 | Megdal | G01S 11/14 367/117 |
| 2016/0282442 A1 | 9/2016 | O'mahony | |
| 2019/0185122 A1* | 6/2019 | Hamme | G01S 15/74 |

OTHER PUBLICATIONS

V. Djapic and Đ. Nađ. "Collaborative Autonomous Vehicle Use in Mine Countermeasures," Sea Technology Magazine. 51(11):1-7. Jun. 2010.
http://www.blueprintsubsea.com/divernav/index.php.
http://www.caddy-fp7.eu/web/66_76_0_-1_-1_-1_izbornik_default.aspx.
http://www.kenautics.com/.

* cited by examiner

DIVER NAVIGATION, INFORMATION AND SAFETY BUOY

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 103,452.

BACKGROUND OF THE INVENTION

Field of Invention

This disclosure relates to buoys, and more particularly, diver navigation, information and buoys.

Description of Related Art

Various systems have been devised that track a diver. However, those systems do not generally provide precise navigation information; nor do those systems also provide for the safety of the diver, and good communication of other information between the diver and surface personnel.

There is a need for a system that provides precise navigation information for a diver, safety information for the diver, and communication of other information between the diver and surface personnel.

BRIEF SUMMARY OF INVENTION

The present disclosure addresses the needs noted above by providing a diver navigation, information and safety buoy system. In accordance with one embodiment of the present disclosure, the system comprises a float device. The system also includes a global positioning system, including a global positioning system antenna device mounted on the float device and a global positioning system receiver device disposed on the float device. The global positioning system provides float position information for the float device. The float position information includes a latitude and longitude for the float device.

The system also includes a diver transponder that is capable of receiving latitude and longitude information. The diver transponder is capable of transmitting the diver location information, the diver location information including a distance of the diver from the float device and an angle of the diver from the float device.

The system also includes an ultra-short baseline acoustic array that is capable of underwater wireless communication with the diver transponder. The ultra-short baseline acoustic array is capable of transmitting the diver location information. The ultra-short baseline acoustic array includes multiple hydrophones and an acoustic transmitter. The ultra-short baseline acoustic array is mounted on the float device.

The system also includes an automatic identification system, including an automatic identification system antenna device mounted on the float device and an automatic identification system transmitter/receiver disposed on the float device, the automatic identification system being capable of emitting float device identification information about the float device location and a status of diving operations.

The system also includes a diver processor configured to calculate a diver's position and to determine diver navigation information, and a power source disposed on the float device. The power source is capable of supplying power to the diver navigation, information and safety buoy system.

These, as well as other objects, features and benefits will now become clear from a review of the following detailed description, the illustrative embodiments, and the accompanying drawings.

DETAILED DESCRIPTION OF THE INVENTION

A diver navigation, information and safety buoy system and method are described herein. The system and method disclosed herein permit relatively precise tracking of a diver, including the diver's latitude, longitude and depth. In this manner, a diver may be kept safe as the diver's precise location may always be known. The system also permits communication with a diver, including communications that guide the diver to a particular location. The system and method could also be used to map out areas so that a diver could go back to a spot that was earlier identified. In addition, the system and method may be used to determine and track the location of other objects, especially water-based objects. The system and method could also allow oceanographic researchers to mark a location and return to it at a later date.

The system and method include various electronics such as a global positioning system that determines and communicates the location of the system. Precise navigation information is provided to both the diver and support vessel from which the buoy system may have been launched.

The electronics also include an acoustic system for communication with the diver so that the diver may be navigated through the water and, with additional sensors, diver health information can be communicated from the diver to surface personnel. Surface personnel, e.g., at a support vessel or on the buoy itself, can send messages to the diver via a tablet or tank-mounted diver transponder, thus providing navigation instructions to the diver for particular destinations and routes. These destination and/or routing messages would show up on the tablet so that the diver could see these messages and use the information during the dive.

The electronics also include an automatic identification system that may communicate to other vessels that a diver is in the water. The automatic identification system may be used as an emergency distress mechanism if the diver becomes incapacitated or loses the support vessel, thereby providing the diver or divers an additional layer of safety in an emergency. Antennas may be mounted on the buoy system. Other related electronics may be disposed in a substantially waterproof electronics bay on the buoy system. The diver navigation, information and safety buoy system is a self-contained system.

Figure 1:
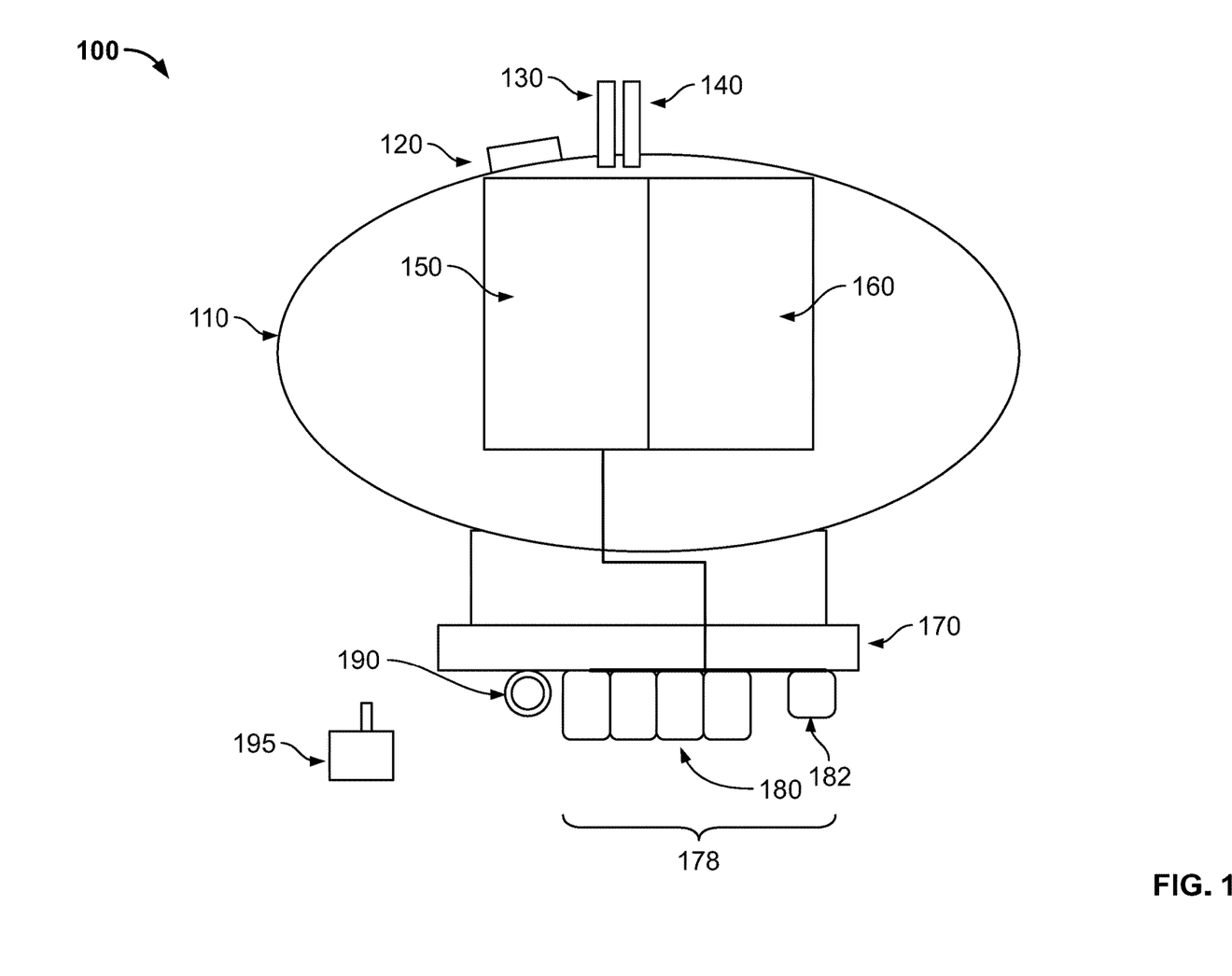
FIG. 1 is an illustration of a diver navigation, information and safety buoy system in accordance with one embodiment of the present disclosure.

FIG. 1 is a diagram of diver navigation, information and safety buoy system in accordance with one embodiment of the present disclosure. In the present illustration, the diver navigation, information and safety buoy system 100 includes a float device 110. In this illustration, the float device 110 is composed of a high-density PVC-coated foam or any other material capable of floating with all the antennas, electronics and other system components attached. In lieu of a high-density PVC-coated foam, it should also be understood that the float device 110 could take on other forms. For example, the float device 110 could be a boat.

The diver navigation, information and safety buoy system 100 further includes various antennas that serve as communication media for both the diver and the support vessel from which the diver navigation, information and safety buoy system 100 may have been launched. The various antennas are mounted on the float device 110. The various antennas may be mounted on the float device 110 in such a way as to optimize antenna reception, as can be appreciated by one of ordinary skill in the art. The various antennas include a global positioning system (GPS) antenna 120 (or an equivalent GPS antenna device) which may be part of a larger global positioning system (GPS), which may include other electronics that are described in greater detail in connection with FIG. 3 hereinbelow. The GPS antenna 120 is mounted on the float device 110. The GPS provides float position information for the float device 110, including a latitude and longitude for the float device 110.

The diver navigation, information and safety buoy system 100 further includes a general mobile radio service/frequency modulation (GMRS/FM) antenna 130 (or an equivalent GMRS/FM antenna device), and an automatic identification system (AIS) antenna 140 (or an equivalent AIS antenna device). The GMRS/FM antenna 130 is mounted on the float device 110. The GMRS/FM antenna 130 is capable of receiving position information from the GPS and diver position information. This information could then be broadcast back to a support vessel. The GMRS/FM antenna 130 may be a part of larger GMRS/FM system which may include other electronics that are described in greater detail in connection with FIG. 3 hereinbelow.

The AIS antenna 140 is an automatic tracking system that is used on marine vehicles. The AIS antenna 140 can be part of an AIS system that permits the diver navigation information and safety buoy system 100 to show its location. Because it shows its location, other maritime vehicles can know that the diver navigation information and safety buoy system 100 is in the area and these other maritime vehicles can avoid collision with the diver navigation information and safety buoy system 100 and its associated divers. Other electronics associated with the AIS system, other than AIS antenna 140, may reside in the electronics bay 150. These other electronics are described in greater detail in connection with FIG. 3 hereinbelow.

The electronics bay 150 may include associated electronics for the diver navigation, information and safety buoy system 100 and method. The electronics bay 150 may be waterproof, or the residing electronics may themselves be potted in order to protect the electronics from, e.g., ocean or sea water. Batteries for the electronics may reside in a rechargeable battery bay 160. These batteries may act as a power source that supplies power to the various electronics in electronics bay 150.

The diver navigation, information and safety buoy system 100 also includes a weighted keel 170. The size of the weighted keel 170 can vary based on the size and weight of the float device 110. For example, the weighted keel 170 can be about five (5) pounds when the remainder of the buoy weighs about fifteen (15) pounds.

The diver navigation, information and safety buoy system 100 also includes an ultra-short base line (USBL) acoustic array 178 for underwater acoustic positioning.

In the present illustration, the USBL acoustic array 178 includes five (5) acoustic elements. The USBL acoustic array 178 includes four hydrophones 180 and one acoustic transmitter 182 located at the origin of the USBL sensor's body frame or surrounding the four hydrophones 180.

The diver navigation, information and safety buoy system 100 also includes a tow point 190 for towing the diver navigation, information and safety buoy system 100. The tow point 190 could be coupled or tethered to a support vessel. Alternatively, the tow point 190 could also be coupled or tethered to the diver so that the diver could be tracked via GPS.

The USBL acoustic array 178 may be operably coupled to diver transponder 195. One transponder, e.g., diver transponder 195, may be provided for each diver. For multiple divers, multiple transponders, e.g., diver transponder 195, may be used. The diver transponder 195 is capable of receiving diver location information in the form of latitude and longitude information. The diver transponder 195 is capable of transmitting the diver location information. In addition to acting as a transponder, diver transponder 195 is capable of sending data from diver sensors (e.g., pressure sensor, tablet, diver health information monitoring sensors, etc.) as described in greater detail hereinbelow in FIGS. 5 and 6. The general mobile radio service/frequency modulation antenna 130 is capable of receiving diver location information coming from diver transponder 195 and float position information from the GPS. This information could then be broadcast back to a support vessel or other desired location.

The diver location information may include a distance of the diver from the float device 110 and an angle or bearing of the diver from the float device 110. The USBL acoustic array 178 is capable of underwater wireless communication with diver transponder 195 to receive diver location information. The USBL acoustic array 178 is also capable of transmitting the diver location information. The USBL acoustic array 178 is mounted on the float device 110.

The diver navigation, information and safety buoy system 100 can guide a diver to a desired location with minimal navigation correction information (about forty bits) that may be sent via simplified acoustic modem, which may be integrated into the USBL acoustic array 178. The navigation correction information may be sent relatively frequently, e.g., every one to two seconds. These corrections may include the range and bearing to the diver, and are determined using the USBL acoustic array 178.

USBL acoustic arrays have begun to find use in 'inverted' (iUSBL) configurations. With such a configuration, a transceiver of the USBL acoustic array 178 is mounted on float device 110, and the transponder 195 is mounted on the diver. In this manner, data processing occurs on the float device 110 to allow it to locate the diver transponder 195 on a diver.

The USBL hydrophones 180 communicate with the diver transponder 195 to emit a specific acoustic pulse to query the diver transponder 195. Then, the pulse may travel through the water to the diver transponder 195. The diver transponder 195 may detect the signal emitted from the USBL acoustic array 178 and respond with a unique acoustic pulse associated with diver transponder 195 that has been pre-programmed so that the USBL acoustic array 178 recognizes this unique acoustic pulse.

A pulse from diver transponder 195 may return through the water to the USBL hydrophones 180. The USBL hydrophones 180 may detect the signal from diver transponder 195. The USBL hydrophones 180 may then determine the round trip acoustic travel time and phase delay of the signal to each of the transducers in the USBL hydrophones 180.

The sound speed at the USBL acoustic array 178 may be used to calculate the received bearing of the diver transponder signal. The average sound speed of the surrounding water may be used to calculate the range to the diver transponder 195.

The diver's x position could be calculated as follows:

$$x_{diver} = x_c + \cos(\psi_c + \varepsilon)/\text{sqrt}(D^2 - z_{diver}^2) \quad \text{(Equation 1)}$$

where x_diver is position of diver (latitude of diver), y_diver is position of diver (longitude of diver), and z_diver is depth of diver.

The diver's y position could be calculated as follows:

$$y_{diver} = y_c + \sin(\psi_c + \varepsilon)/\text{sqrt}(D^2 - z_{diver}^2) \quad \text{(Equation 2)}$$

where y_diver is position of diver (longitude of diver), and z_diver is depth of diver. In addition to the devices shown in FIG. 1, the diver navigation, information and safety buoy system 100 may include other items such as an electronic compass, and a support vessel monitoring unit.

Figure 2:
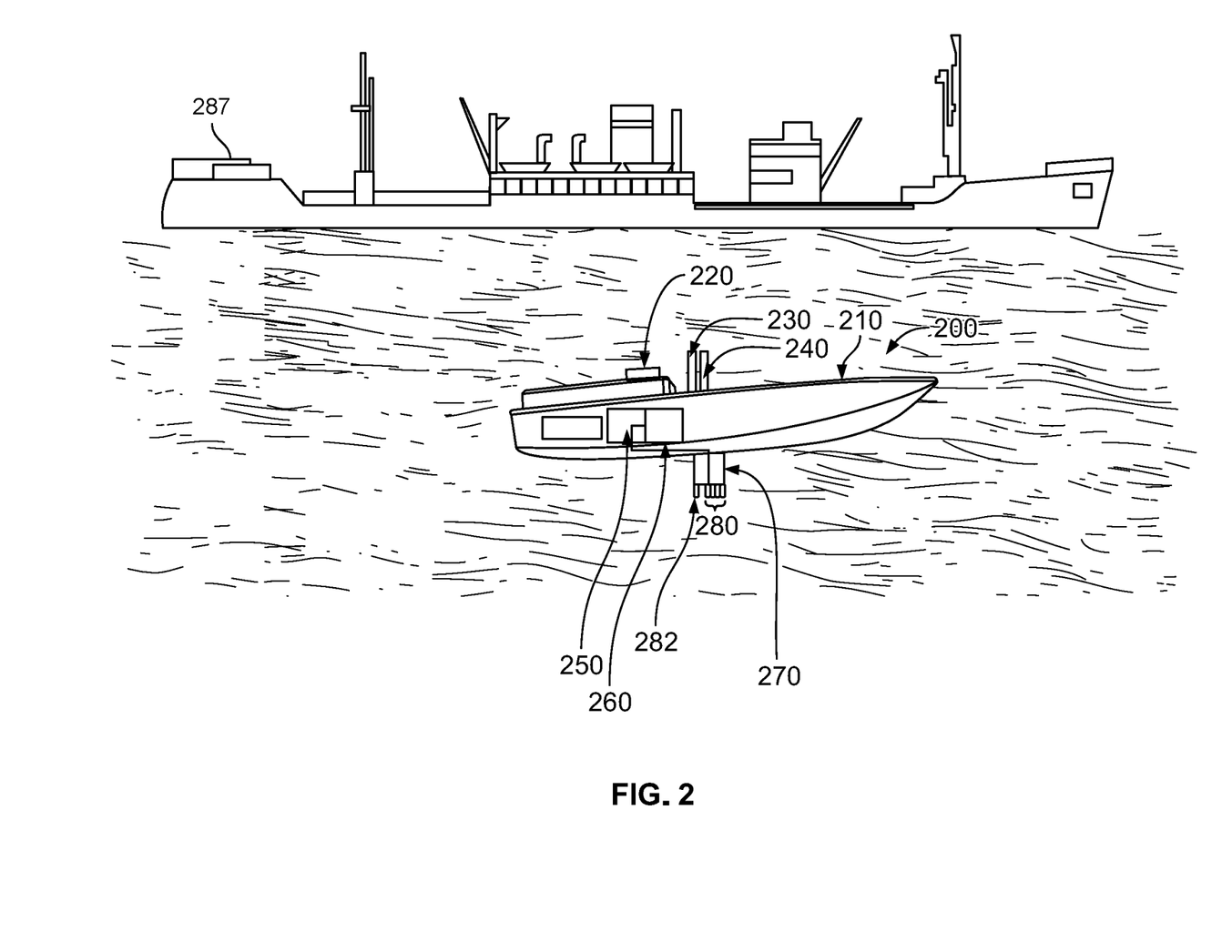
FIG. 2 is an illustration of diver navigation, information and safety buoy system as part of an unmanned surface vehicle, in accordance with one embodiment of the present disclosure.

FIG. 2 is an illustration of diver navigation, information and safety buoy system 200 as an unmanned surface vehicle, in accordance with one embodiment of the present disclosure. In this embodiment, the float device 210 is an unmanned surface vehicle in the form of boat that is a fully functional, self-propelled vehicle.

The diver navigation, information and safety buoy device 200 further includes various antennas that serve as communication media for the diver. The various antennas are mounted on the float device 210. The various antennas include a GPS antenna 220, a GMRS/FM antenna 230 and an AIS antenna 240.

The GPS antenna 220 may provide a latitude and longitude for the diver navigation information and safety buoy system 200. The GMRS/FM antenna 230 may provide two-way communication between the diver navigation information and safety buoy system 200 and another vehicle or system.

The AIS antenna 240 is part of an automatic identification tracking system that is used on marine vehicles. The AIS antenna 240 is mounted on the float device 210 and an AIS transmitter/receiver is disposed on the float device, such as in the electronics bay 250. The AIS system is capable of emitting float device identification information about the float device 210 and a status of diver operations. The status of diver operations may include an indication that a diver is in the water and/or that diving operations are underway.

The GMRS/FM antenna 230 is mounted on the float device 210. The general mobile radio service/frequency modulation antenna 230 is capable of receiving position information from the GPS, diver position information coming from a diver transponder (not shown) and buoy position. The information may be broadcast to a support vessel 287. Support vessel 287 may include a support vessel monitoring unit, e.g., a laptop aboard the support vessel. Using this support vessel monitoring unit, personnel on the support vessel 287 may monitor the diver navigation information and safety buoy system 200 as well as any associated divers.

The diver navigation, information and safety buoy system 200 also includes an electronics bay 250 and a rechargeable battery bay 260. The electronics bay 250 may include associated electronics for the diver navigation, information and safety buoy system 200, including non-antenna electronics that are described in greater detail hereinafter in connection with FIG. 3. The rechargeable battery bay 260 may include rechargeable batteries for electronics associated with the diver navigation, information and safety buoy system 200.

The diver navigation, information and safety buoy system 200 also includes a weighted keel 270, USBL acoustic hydrophones 280 and acoustic transmitter 282 for underwater acoustic positioning. The size of the weighted keel 270 can vary based on the size and weight of the float device 210. The USBL hydrophones 280 and acoustic transmitter 282 may be operably coupled to one or more transponders, e.g., a diver transponder. The USBL acoustic array may include five acoustic elements. The USBL acoustic array could include four hydrophones 280 and an acoustic transmitter 282 that could also act as diver transponder (e.g., diver transponder 195 of FIG. 1).

As indicated hereinabove, the diver navigation, information and safety buoy system 200 is an unmanned surface vehicle. The unmanned surface vessel allows the buoy system to remain untethered to the diver. However, the buoy system 200 could take cues from the diver location information processed onboard the buoy system 200. The diver navigation, information and safety buoy system 200 could send cues to the vessel electronics to move using attached motors. This movement could propel the buoy system 200 in the direction of one or more divers in order to maintain optimum acoustic communications with the divers.

Figure 3:
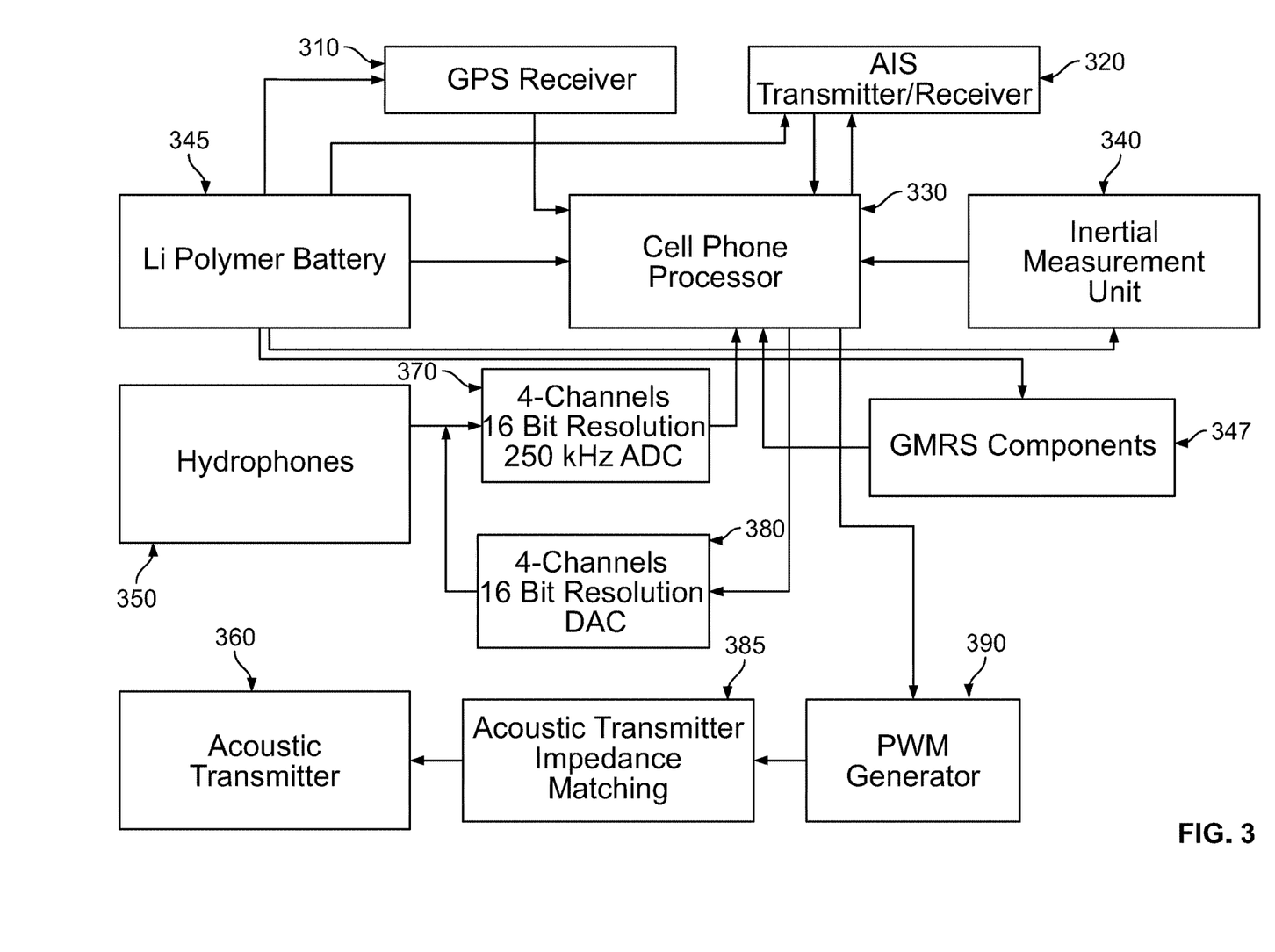
FIG. 3 is a diagram of electronics in the electronics bay of the diver navigation, information and safety buoy system, in accordance with one embodiment of the present disclosure.

FIG. 3 is an illustration of electronics that may reside in the electronics bay of the diver navigation information and safety buoy device of FIG. 1 or 2. Referring now to FIGS. 1 and 3 together, the electronics may include a GPS receiver 310. GPS receiver 310 is capable of receiving information from one or more GPS satellites and then to calculate the geographical position of the GPS receiver 310. Using GPS software that is known in the art, the GPS receiver 310 may display its position on a map, and it may offer directions. The GPS receiver 310 may be part of a larger GPS that includes GPS antenna 120 mounted on the float device 110. The global positioning system may provide float position information for the float device 110. The float position information includes a latitude and longitude for the float device 110.

The electronics bay may also include an AIS transmitter/receiver 320. The AIS transmitter/receiver 320 may be used to supplement the buoy's radar (if any). The AIS transmitter/receiver 320 may be used in order to avoid collisions between other water vessels and the diver navigation information and safety buoy system 100. The AIS transmitter/receiver 320, along with the AIS antenna 140 may form an AIS system. The AIS antenna 140 may be mounted on the float device 110. An AIS transmitter/receiver 320 may be disposed on the float device in the electronics bay 150. The AIS system is capable of emitting float device identification information about the float device 110.

The GPS receiver 310 and the AIS transmitter/receiver 320 are capable of sending information to cell phone processor 330. Cell phone processor 330 may operate at a speed of one gigahertz, with five hundred twelve (512) megabytes of integrated random access memory (RAM), and an on-board four (4) gigabyte flash storage. Other configurations for the cell phone processor 330 are also possible, as can be appreciated by one of ordinary skill in the art. The cell phone processor 330 should have sufficient speed, RAM and storage to support operations of the associated electronics, including GPS receiver 310, AIS transmitter/receiver 320, inertial measurement unit 340 and GMRS system 347. The AIS transmitter/receiver 320 may send a signal to other boats every minute or so.

An inertial measurement unit 340 may also be operably coupled to cell phone processor 330. Inertial measurement unit 340 may be a small, tactical grade, low weight, high performance non-GPS aided Inertial Measurement Unit (IMU). It may contain micro-electromechanical systems (MEMS) gyros, accelerometers and inclinometers. The inertial measurement unit 340 may control the orientation of the buoy with respect to an inertial frame of reference, which is a latitude and longitude at a particular point in time. The IMU 340 may be used to smooth the GPS data as IMUs do in smartphones for street navigation.

GMRS components 347 may include a radio GMRS transmitter & receiver chip set. The GMRS components 347 may operate in conjunction with the GPS receive 310 to obtain position information for the float device 110 and the diver.

The hydrophones 350 and acoustic transmitter 360 form a USBL acoustic array. Acoustic sound waves from the hydrophones 350 can propagate through water much better than the radio waves that are used to communicate above water through air. Multiple hydrophones may be needed, and the minimum number of hydrophones needed is three. (If two hydrophones were to communicate with one unit, two lines can cross.) The range is calculated by sending a message and starting a counter. When the message is returned, the counter is stopped. Using that timing information along with the speed of sound in a water medium, one can calculate distance. The USBL hydrophones 350 could be potted, i.e., made waterproof, e.g., by taking components and placing them into a mold and using a two-step epoxy to hold the components together, as can be appreciated by one of ordinary skill in the art. Other electrical components described herein could also be potted in the manner in order to protect the electronics from harmful effects of the surrounding water.

An analog-to-digital converter 370 may be coupled between the hydrophones 350 and the cell phone processor 330. The analog-to-digital converter may be used to convert analog signals from the hydrophones 350 to digital signals for the cell phone processor 330. The analog-to-digital converter 370 may have four channels and 16-bit resolution and operate at 250 kHz.

A digital to analog converter 380 may be operably coupled between the hydrophones 350 and the cell phone processor 330. The digital-to-analog converter 380 may be used to convert digital signals from the hydrophones 350 to analog signals for the cell phone processor 330. The digital-to-analog converter 380 may have four channels and 16-bit resolution.

An acoustic transmitter impedance matching device 385 may be disposed in the electronics bay 150. When an acoustic transmitter emits acoustic waves toward a receiver, the impedance of the transmitter and receiver must match so that the power transferred between the transmitter and receiver is maximized and the transmitters energy will be available to the receiver.

The electronics bay 150 in which all of these devices reside, can be disposed on the float device 110 in a recessed area reserved for electronics. Alternatively, the electronic devices can be tethered to a diver. As yet another alternative, the electronic devices can be interfaced with a small unmanned surface vessel (e.g., the unmanned surface vehicle shown in FIG. 2) with motors and steering to maintain a position near the divers at all times.

Figure 4:
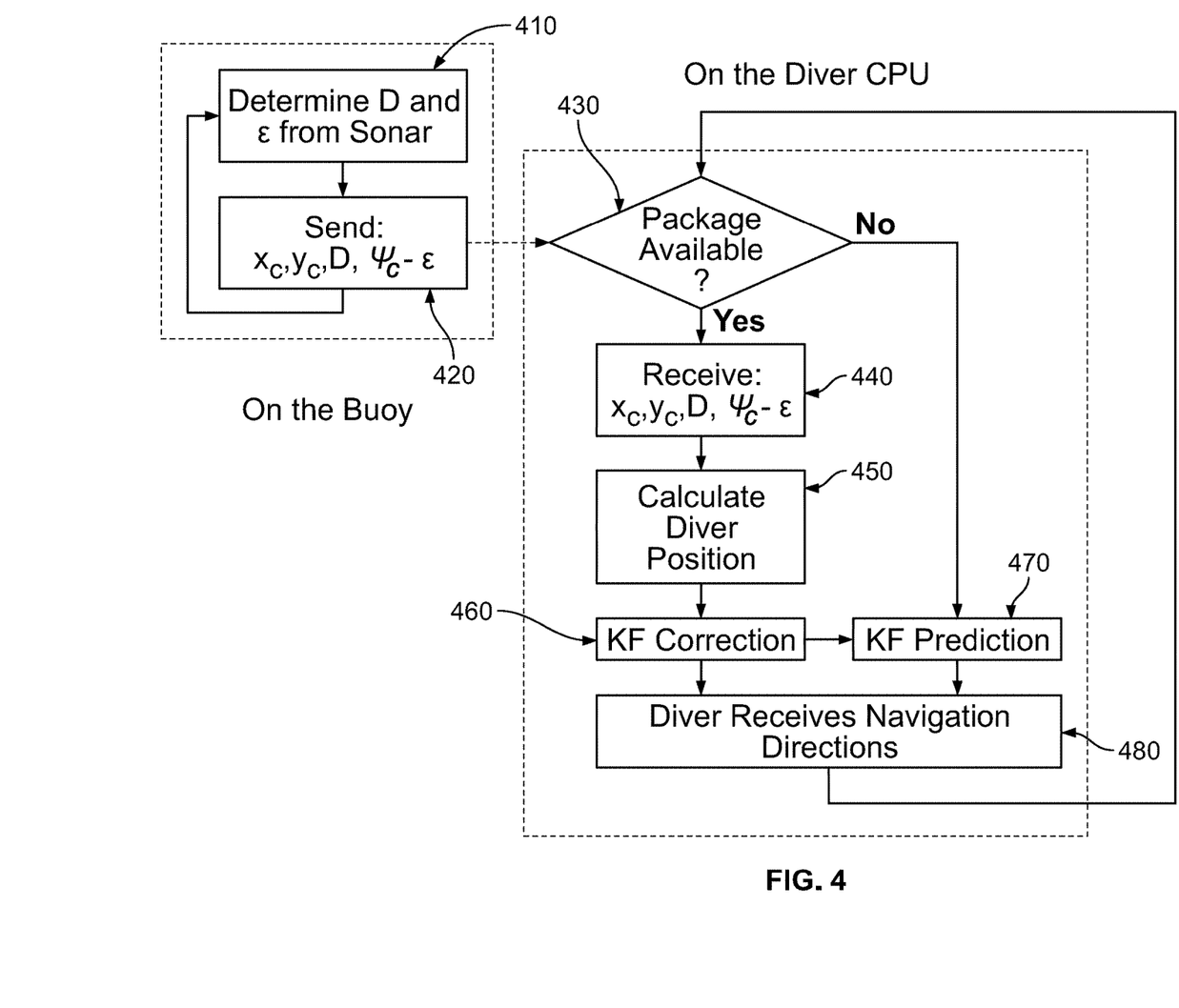
FIG. 4 is a flow diagram of software instructions executed on board the buoy processing unit and the diver central processing unit, in accordance with one embodiment of the present disclosure.

FIG. 4 is a flow diagram of software instructions executed in connection with a method for diver navigation information and safety. These instructions may be executed in part by a buoy processor on board the diver navigation information and safety buoy system. Remaining instructions can be executed by a diver central processing unit which may be attached to, or held by, the diver, in accordance with one embodiment of a method for diver navigation, information and safety.

At step 410, the system, via buoy processor, determines two variables from sonar. Particularly, the system determines the range from buoy to diver (D) and the bearing from the buoy to the diver ($\varepsilon$). At step 420, the system sends various information from the buoy processor to the diver processor. Both buoy processor and diver processor may be of the type that resides on cell phones, e.g., cell phone processor 330 of FIG. 3. Referring back to FIG. 4, the buoy processor may send the global positioning position of the buoy ($x_c$, $y_c$), the range from the buoy to the diver (D), the heading of the buoy ($\psi_c$), and the bearing from the buoy to the diver ($\varepsilon$) to the diver processor. The diver processor determines whether a package of information is available. If a package is available, then at step 440, the diver processor receives the global positioning position of the buoy ($x_c$, $y_c$), the range from the buoy to the diver (D), the heading of the buoy ($\psi_c$), and the bearing from the buoy to the diver ($\varepsilon$) to the diver processor.

At step 450, the system calculates the diver position global positioning position of the buoy ($x_c$, $y_c$), the range from the buoy to the diver (D), the heading of the buoy ($\psi c$), and the bearing from the buoy to the diver ($\varepsilon$) to the diver processor. These calculations are shown hereinabove in connection with Equations 1 and 2.

At step 460, a Kalman filter (KF) correction is performed. The Kalman filter aids in providing a more accurate measurement by using a series of measurements observed, and provides estimates on a diver's location or position.

At step 470, a Kalman filter prediction is performed, pursuant to which the diver position is estimated. At step 480, the diver receives navigation information and swims in accordance with the navigation information received. The navigation information can include turns similar to a GPS system for a car.

Figure 5:
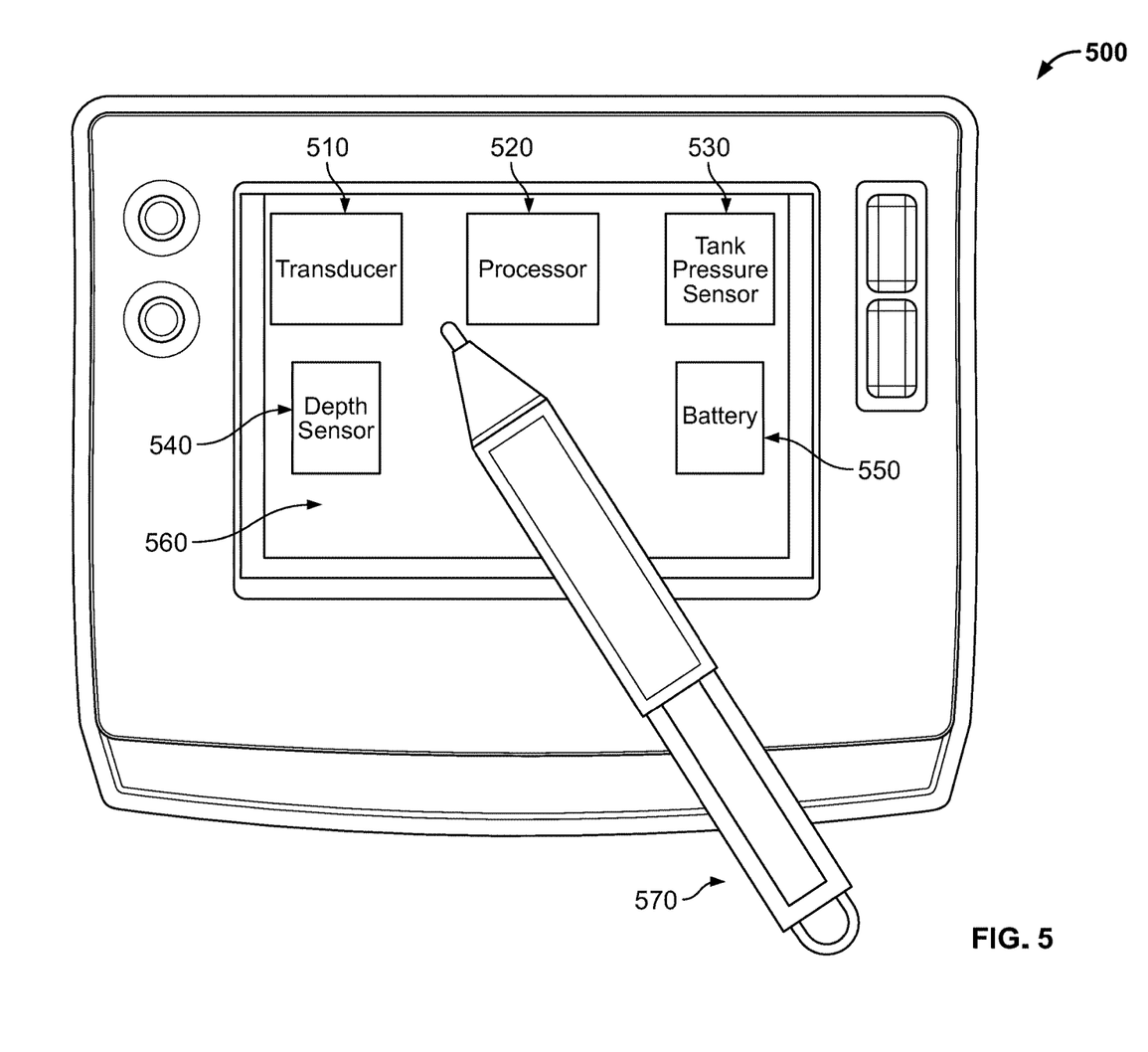
FIG. 5 is a submersible tablet that is part of the navigation, information and safety buoy system, in accordance with one embodiment of the present disclosure.

FIG. 5 is a submersible portable communication device 500 such as a tablet that is part of a navigation, information and safety buoy system, in accordance with one embodiment of the present disclosure. If the diver is following a grid, the personal communication device 500 could show the diver where the diver is within the grid. If the diver wanted to mark the location of an object, the diver could mark an object's location on the tablet and the information could be sent to the buoy. A latitude-longitude could be determined for the buoy and accurate GPS information on the object could be acquired.

Figure 6:
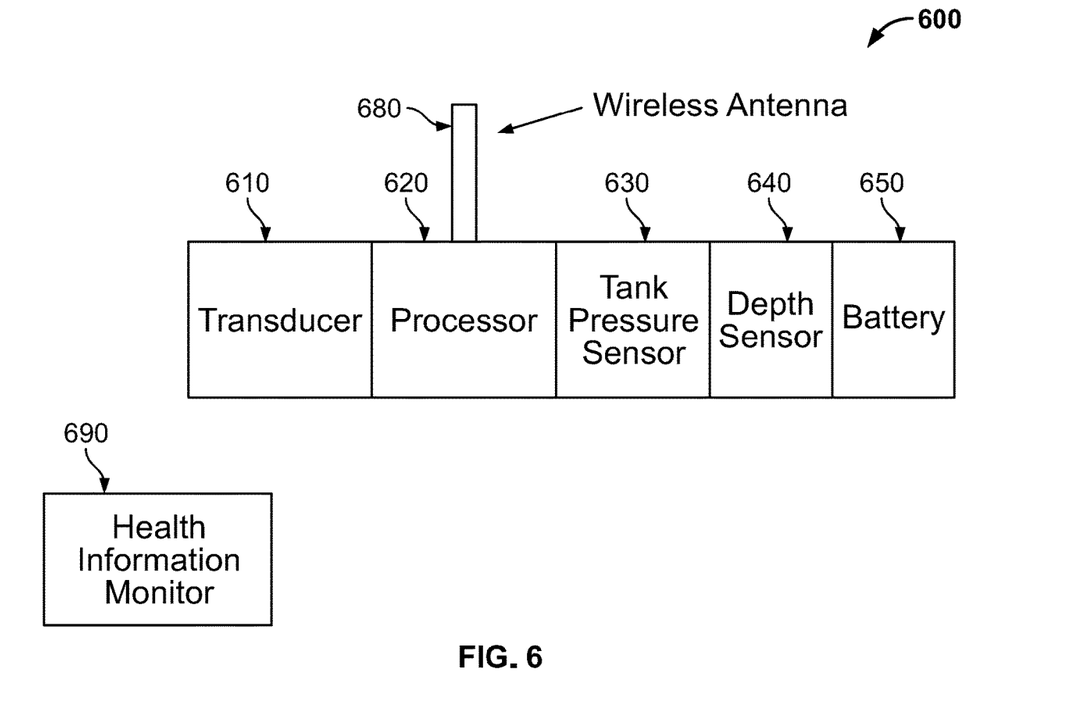
FIG. 6 is a tank-mounted diver transponder, in accordance with one embodiment of the present disclosure.

Instead of having the personal communication device 500, one could use this the tank-mounted transponder of FIG. 6, which has essentially all the functionality of personal communication device 500 except for the screen. Typically, either the tank-mounted transponder of FIG. 6 or the personal communication device of FIG. 5 would be used, but not both as they have similar functionality. With a diver transponder alone, diver tracking may occur. However, with the addition of the personal communication device 500, a diver would be able to communicate with a surface buoy.

The tank-mounted transponder of FIG. 6 could be attached to every diver. The personal communication device 500 of FIG. 5 could be handed to one diver during the dive, and could be used by multiple divers who could move to different spots. The personal communication device 500 would be tracked in the latter case.

The personal communication device 500 includes a transducer 510 which may be fairly small, e.g., two inches (2") by one inch (1"). The transducer 510 is used to receive and transmit diver location and health information to the surface vessel via the buoy system along with position updates and information sent from the surface vessel to the diver via the buoy system. The transducer 510 may be potted so that it is substantially waterproof.

The personal communication device 500 may also include a processor 520 which may be of the type of processor that is used in cell phones.

A tank pressure sensor 530 may be a part of the personal communication device 500. Each personal communication device 500 may have an optional tank pressure sensor 530 which may be useful to notify a diver that the diver's oxygen is running out. A depth sensor 540 may be provided as a strain gauge that measures the depth of the personal communication device 500 when the depth sensor 540 is integrated into a personal communication device 500. Alternatively, the depth of a diver may be measured by the tank-mounted transponder of FIG. 6. In lieu of depth sensor 540 and tank pressure sensor 530, the personal communication device of FIG. 5 could use a general purpose wireless local area networking (Wi-Fi) antenna. Transducer 510 can be separated from the personal communication device 500. The user may want to have a tablet that does not have transducer 510 attached. As yet another alternative, depth sensor 540 can be attached to transducer 510 but not to personal communication device 500.

The strain gauge of the depth sensor 540 may turn depth into a voltage, and that is how depth is measured. The personal communication device 500 may also include a battery 550. The battery 550 may be the same type of battery that is commonly used with tablets. For example, the battery may be a lithium-ion battery or a lithium-polymer battery. A display screen 560 and stylus 570 may be included with the personal communication device 500. Information such as diver navigation instructions could be displayed on the display screen 560. The stylus 570 could be used by the diver to input information so that it can be communicated to surface personnel on the diver navigation information and safety buoy system and/or a support vessel.

If a diver wished to mark the a location, the diver could do so using the personal communication device 500. The diver could also use the personal communication device 500 to obtain position information and receive instructions on where to move to reach a particular destination.

FIG. 6 is a tank-mounted diver transponder, in accordance with one embodiment of the present disclosure. This tank-mounted diver transponder 600 may be used in lieu of diver transponder 195 of FIG. 1.

The tank-mounted diver transponder 600 could also be used instead of the personal communication device of FIG. 5. Similar to the personal communication device 500 of FIG. 5, the tank-mounted diver transponder includes a transducer 610, a processor 620, a tank pressure sensor 630, a depth sensor 640 and a battery 650. The tank-mounted diver transponder 600 also includes a wireless antenna 680 that could pick up data, e.g., the diver's depth. The tank pressure sensor 630 could be wireless, and could have its signal picked up by the wireless antenna 680. In lieu of depth sensor 640 and tank pressure sensor 630, the tank mounted diver transponder 600 could use a general purpose wireless local area networking (Wi-Fi) antenna. Transducer 610 can be separated from the tank mounted diver transponder 600. The user may want to have a tank-mounted diver transponder 600 that does not have transducer 610 attached. As yet another alternative, depth sensor 640 can be attached to transducer 610 but not to tank-mounted diver transponder 600.

A health information monitor 690 may be connected to the diver's body. The health information monitor 690 is capable of monitoring information such as glucose levels, e.g., where the health information monitor 690 is a tattoo-type sensor. The health information monitor 690 may be a mouthpiece that can measure saliva. The health information monitor 690 may also measure health information through sweat, and the measurement can be translated into health information for the diver. The health information monitor 690 could also be a hydrophone located inside the diver's wetsuit that could tell a diver's nitrogen level via Doppler-type system. The health information monitor 690 could also measure the diver's heart rate and other potential distress measures of a diver.

Figure 7:
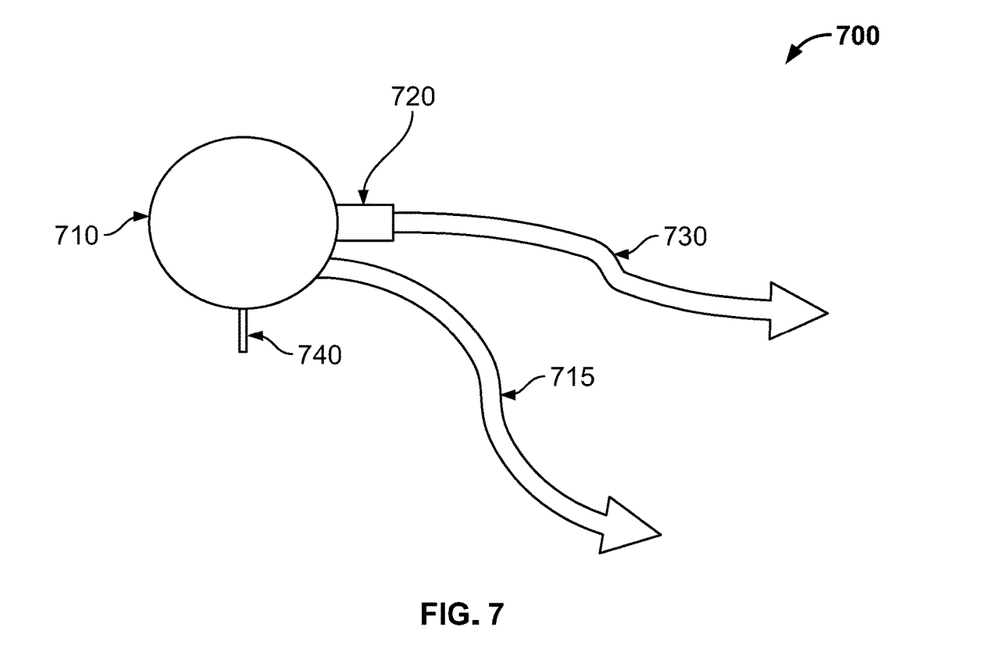
FIG. 7 is a diver data transmission unit, in accordance with one embodiment of the present disclosure.

FIG. 7 is a diver data transmission unit, in accordance with one embodiment of the present disclosure. The diver transmission unit 700 includes a diver first stage regulator 710, a coaxial cable 715 that may lead to a second stage regulator (not shown), a high pressure port T-fitting 720, a coaxial cable 730 that may be connected to a pressure gauge, and an antenna 740 which may communicate wirelessly with a diver transponder pressure sensor. The high pressure port T-fitting 720 is coupled to the diver first stage regulator 710. The diver first stage regulator 710 takes air from a high pressure and reduces it down to a low pressure that the diver breathes. A coaxial cable 715 may connect the first stage regulator to a second stage regulator (not shown) which may be a mask from which the diver breathes. In the present illustration, the high pressure port T-fitting 720 is mounted on the diver first stage regulator 710. The high pressure port T-fitting 720 is standard equipment for a diver, and it is fairly standard for diving equipment. The coaxial cable 730 may be coupled to an analog pressure gauge. The high pressure port T-fitting 720 may have a strain gauge that transmits pressure wirelessly to the personal communication device 500 of FIG. 5. Alternatively, the high pressure port T-fitting 720 may have a strain gauge that transmits pressure wirelessly to the tank-mounted diver transponder of FIG. 6. Antenna 740 may wirelessly communicate with diver transponder pressure sensor 630 of FIG. 6.

Antenna 740 can read pressure from a pressure gauge via Wi-Fi connection. Short distance Wi-Fi from pressure gauge to transponder can work underwater, e.g., for about a meter. However, because radio waves are attenuated underwater, radio waves are not ideal for communication over greater underwater distances.

The present system and method provide a compact self-contained GPS-integrated USBL navigation and tracking acoustic system. The present system and method increase safety using AIS which allows surrounding vessels situational awareness, and lets other vessels know when divers are in the water. The present system and method can provide diver information, including diver location and health information to those on the surface. The present system and method allow the diver to be navigated to a desired destination. In this connection, one or more divers can each carry a small tablet which can provide grids and/or navigation information. The AIS can run on a cell phone processor, and small batteries. Therefore, the unit on the buoy would not be large.

It will be understood that many additional changes in the details, materials, steps and arrangement of parts, which have been herein described and illustrated to explain the nature of the release system, may be made by those skilled in the art within the principle and scope of the invention as expressed in the appended claims.

We claim:

1. A diver navigation, information and safety buoy system, comprising:
   a float device;
   a global positioning system, including a global positioning system antenna device mounted on the float device and a global positioning system receiver device disposed on the float device; the global positioning system providing float position information for the float device, wherein the float position information includes a latitude and longitude for the float device;
   a diver transponder that is capable of receiving latitude and longitude information, the diver transponder being capable of transmitting diver location information, the diver location information including a distance of the diver from the float device and an angle of the diver from the float device;
   an ultra-short baseline acoustic array that is capable of underwater wireless communication with the diver transponder, the ultra-short baseline acoustic array being capable of transmitting the diver location information, wherein the ultra-short baseline acoustic array includes multiple hydrophones and an acoustic transmitter, wherein the ultra-short baseline acoustic array is mounted on the float device;
   an automatic identification system, including an automatic identification system antenna device mounted on the float device and an automatic identification system transmitter/receiver disposed on the float device, the automatic identification system being capable of emitting float device identification information about the float device and a status of diver operations;
   a diver processor configured to calculate a diver's position and to determine diver navigation information; and
   a power source disposed on the float device, the power source being capable of supplying power to the diver navigation, information and safety buoy system.

2. The diver navigation, information and safety buoy system of claim 1, further comprising:
   a general mobile radio service/frequency modulation system including a general mobile radio service/frequency modulation antenna device mounted on the float device, the general mobile radio service/frequency modulation antenna device being capable of receiving and broadcasting the diver location information and the float position information.

3. The system of claim 1, wherein the system is configured to include one or more health information monitors for the diver, thereby providing health information on the diver.

4. The system of claim 1, wherein the diver transponder is mounted on a diver tank.

5. The system of claim 1, wherein the diver transponder is mounted on a portable communication device.

6. The system of claim 1, wherein the diver navigation, information and safety buoy system is configured to communicate with a diver data transmission unit.

7. The system of claim 1, further comprising:
   an electronics bay configured to receive electronics that are disposed on the float device; and
   a rechargeable battery bay configured to store batteries for the diver navigation, information and safety buoy system.

8. The system of claim 1, further comprising:
   a tow point that permits the float device to be tethered to an object or person.

9. A method for diver navigation, information and safety, the method comprising:
   providing a diver navigation, information and safety buoy system, the diver navigation, information and safety buoy system having:
      a float device;
      a global positioning system, including a global positioning system antenna device mounted on the float device and a global positioning system receiver device disposed on the float device; the global positioning system providing float position information for the float device, wherein the float position information includes a latitude and longitude for the float device;
      a diver transponder that is capable of receiving latitude and longitude information, the diver transponder being capable of transmitting diver location information, the diver location information including a distance of the diver from the float device and an angle of the diver from the float device;
      an ultra-short baseline acoustic array that is capable of wireless communication with the diver transponder, the ultra-short baseline acoustic array being capable of transmitting the diver location information, wherein the ultra-short baseline acoustic array includes multiple hydrophones and an acoustic transmitter, wherein the ultra-short baseline acoustic array is mounted on the float device;
      an automatic identification system, including an automatic identification system antenna device mounted on the float device and an automatic identification system transmitter/receiver disposed on the float device, the automatic identification system being capable of emitting float device identification information about the float device;
      a diver processor configured to determine diver navigation information;
      a power source disposed on the float device, the power source being capable of supplying power to the diver navigation, information and safety buoy system;
      a submersible personal communication device having a diver processor;
      a buoy processor disposed on the float device;
   receiving, from the ultra-short baseline acoustic array in communication with the diver transponder, the diver location information;
   calculating, via the buoy processor, a diver position, wherein the diver position calculation is based on the distance of the diver from the float device, the angle of the diver from the float device, the float position information for the float device, and a heading of the buoy, and providing, by the diver processor, navigation directions to the diver at the submersible personal communication device.

10. The method of claim 9, further comprising:

providing health information on the diver, wherein the diver navigation, information and safety buoy system further includes one or more health information monitors for the diver.

11. The method of claim 9, wherein the diver transponder is mounted on a diver tank.

12. The method of claim 9, wherein the diver transponder is mounted on a portable communication device.

13. The method of claim 9, wherein the diver navigation, information and safety buoy system is configured to communicate with a diver data transmission unit.

14. The method of claim 9, wherein the diver navigation, information and safety buoy system further has an electronics bay configured to receive electronics that are disposed on the float device; and a rechargeable battery configured to receive batteries for the diver navigation, information and safety buoy system.

15. The method of claim 9, wherein the diver navigation, information and safety buoy system further has a tow point that permits the float device to be tethered.

16. A diver navigation, information and safety buoy system, comprising:

a float device;

a global positioning system, including a global positioning system antenna device mounted on the float device and a global positioning system receiver device disposed on the float device; the global positioning system providing float position information for the float device, wherein the float position information includes a latitude and longitude for the float device;

a diver transponder that is capable of receiving latitude and longitude information, the diver transponder being capable of transmitting diver location information, the diver location information including a distance of the diver from the float device and an angle of the diver from the float device;

an ultra-short baseline acoustic array that is capable of underwater wireless communication with the diver transponder, the ultra-short baseline acoustic array being capable of transmitting the diver location information, wherein the ultra-short baseline acoustic array includes multiple hydrophones and an acoustic transmitter, wherein the ultra-short baseline acoustic array is mounted on the float device;

an automatic identification system, including an automatic identification system antenna device mounted on the float device and an automatic identification system transmitter/receiver disposed on the float device, the automatic identification system being capable of emitting float device identification information about the float device;

a processor configured to determine diver navigation information; and a power source disposed on the float device, the power source being capable of supplying power to the diver navigation, information and safety buoy system, one or more health information monitors for the diver, wherein the diver navigation, information and safety buoy system is capable of transmitting health information for the diver.

17. The system of claim 16, further comprising:

a general mobile radio service/frequency modulation system including a general mobile radio service/frequency modulation antenna device mounted on the float device, the general mobile radio service/frequency modulation antenna device being capable of receiving and broadcasting the diver location information and the float position information.

18. The system of claim 16, wherein the diver transponder is mounted on a diver tank.

19. The system of claim 16, wherein the diver transponder is mounted on a portable communication device.

20. The system of claim 16, wherein the diver navigation, information and safety buoy system is configured to communicate with a diver data transmission unit.

* * * * *